3,535,019
METALLIZED GLASS REFLEX-REFLECTING ELEMENTS
Richard A. Longlet, Maplewood, and John Richard Keller, White Bear Lake, Minn., assignors to Minnesota Mining and Manufacturing Company, St. Paul, Minn., a corporation of Delaware
No Drawing. Filed Oct. 25, 1967, Ser. No. 677,871
Int. Cl. G02b 5/12
U.S. Cl. 350—105                                3 Claims

ABSTRACT OF THE DISCLOSURE

A glass microsphere is metallized with aluminum over a hemispheric portion of the surface and the aluminum is treated to give an outer film of aluminum phosphate or aluminum oxide. The element is reflex-reflective and the outer film serves as a barrier which is impervious to water as well as other ingredients of a resinous binder composition which may be used in the coating of fabric with the reflective composition.

---

This invention relates to a new liquid composition adapted for use in forming paint-like coatings which are immediately reflex-reflecting upon drying. The composition is especially adapted for use in forming coated reflex-reflecting designs of intricate nature on fabric and various articles of apparel.

Liquid marking compositions which immediately reflex-reflect incident light upon drying in a film have been available, but have unfortunately either stiffened fabrics too greatly for widespread use on them or have suffered from other defects when used on fabrics.

Still other liquid compositions suitable for application to fabrics to form markings have required a two-step application procedure. For example, it has been necessary to apply a metallic reflective composition to the fabric as a first step and then to apply a slurry of relatively high index glass beads over the preformed reflective coating. It will readily be appreciated that the formation of an intricate design or pattern of reflex-reflectivity on fabrics is difficult by this two-step procedure because of problems of registration on the non-dimensionally-stable fabric base.

This invention solves such problems as just noted. The composition of the invention, properly packaged, is stable and essentially free of chemical interaction and foaming caused by hydrogen generation. The two-part composition can be stored for lengthy periods and shipped in commerce without damage. It is mixed prior to use and the mixture can be applied in a single step as a paint-like coating upon fabric. The coating is integral with the fabric and immediately reflex-reflects incident light upon drying. Generally, and especially in the case of extraordinarily intricate designs and patterns (as used frequently for ski sweaters), screen process application of the composition onto the fabric is preferred.

Significantly, the composition of the invention adheres well to underlying fabric on which it is screen processed or otherwise coated, and does not unduly stiffen the underlying fabric. Of course, some relative stiffening of the fabric occurs in the area of the applied marking; but this is not so great as to interfer uncomfortably with the drape of the fabric and the necessary flexibility of it during use applications. The fabric will retain reflex-reflectivity in applied areas even on repeated flexing during ordinary wear by a user.

Additionally, the brightness of reflex-reflection of the markers formed on cloth using the present composition is greater than that of markers formed by the two-step process aforenoted, when an equal number of glass beads or microspheres are are employed. Markings formed according to the invention are at least 25 times brighter than white paint and usually at least 50 and even 100 times brighter than white paint. Markings formed on cloth using the composition of the invention are resistant to damage in laundering and dry cleaning.

The composition of the invention is useful to mark sportswear such as jackets, T-shirts, sweat shirts, and the like, as well as other types of garments, with any suitable design or label as may be desired. It even may be used to mark shoes and hats or other articles. Varied colored markings are possible according to the invention.

In essential respects, the composition of the invention consists of several components in particularized relationships as follows: First, particles of thermoplastic organic resin having repetitive reactive side groups (preferably —OH and/or =NH) reactable with a curing agent are present as emulsified particles dispersed in a continuous phase of water. Next, a curing agent capable of chemically reacting with the reactive side groups of the thermoplastic resin is present; and this curing agent is preferably packaged in a separate container from most of the other ingredients of the composition for the purpose of marketing the composition in commerce. Alternately, a curing agent may be employed which only reacts at elevated temperature. Under such circumstances, it may be packaged with the thermoplastic resin portion of the composition; and if desired, a separate package may contain a catalyst to accelerate the reaction between the curing agent, and the thermoplastic resin or cause it to proceed at room temperature. The weight ratio (non-volatile solids) of the curing agent to the thermoplastic resin is between 0.1 and 0.7. A water-miscible volatile organic liquid in which the curing agent is soluble is also included, suitably packaged for shipment in commerce as part of the package containing the curing agent. This organic liquid is not present (by weight) in excess of two times the amount of water in the composition. Important to recognize is the fact that the curing agent is always in a phase of the composition apart from the dispersed particles of the thermoplastic resin, except after the volatile liquids have evaporated after coating the composition to form a film. Optionally, colored particles of pigment material, preferably spheroidal and of a size between about 2 and 70 microns, may be included in the composition to impart desired daytime color appearance to a coating of the composition. Suitable pigment particles are taught in Nellesson U.S. Pat. No. 3,251,704, issued May 17, 1966. Pigment fines smaller than 2 microns are not desired in the composition; and, in essential respects, are not present or present only to an extent not interfering with the providing of immediate reflex reflection by a coating upon drying.

Reflex-reflecting elements of special character are an essential part of the composition. They are transparent glass microspheres having a refractive index ($n_D$) of at least 1.7 up to 2.8 (usually up to 2.0) in a size between about 10 and 100 microns, preferably between about 15 and 50 microns. These microspheres are hemispherically metallized so that they have a specular-reflecting hemispherical surface of metal adjacent the glass of the glass microspheres. On the outermost surface of the hemispherical layer of metal is a hemispherical protective barrier film which prevents contact between the specular-reflecting metal surface and other ingredients in the composition. This barrier film is resistant to removal by, and inert to, other ingredients in the composition.

The total volume of the reflex-reflecting elements and any optional pigment of 2 to 70 microns in the composition bears a certain relationship to the total volume of those two components plus the total volume solids non-volatile material in the composition. This relationship is referred to as a particle volume concentration; and this PVC is between about 40 and 85%, preferably between 55 and 75%. Optional pigment of 2 to 70 microns may account for up to 75% of the total PVC. Where pigment is omitted, the entire PVC is accounted for by the reflex reflecting elements. At the lower limit of PVC, the reflex reflection of an applied color pigmented coating is about as low as is useful for return of an incident beam of light back in a cone toward its source. The higher limit of PVC is about as high as possible while still permitting retention of the reflex reflective elements and optional color pigment particles in an applied coating.

The emulsified thermoplastic resin (dispersed in water as the continuous phase) is such that, when it is cured in film form by the curing agent, the resulting film is flexible and can be bent as a film without cracking. The cured material serves as a binder for the reflex-reflecting elements in the composition. Additionally, of course, it serves as a binder for any pigment which optionally but preferably is employed in the composition. Preferred thermoplastic resins to employ are the vinyl or acrylic types having carboxyl or hydroxyl or amine or amide groupings to provide the —OH or =NH groups for chemical cross-linkage with the curing agent.

Various curing agents, whether water soluble or insoluble, may be employed to cure or react chemically with the thermoplastic resin. Preferred such agents react with the —OH and/or =NH groups of the resin. While curing need not be accomplished to a totally insoluble state, it is preferably accomplished to such an extent that the thermoplastic resin no longer is readily soluble in the usual dry cleaning organic solvents such as white gasoline or perchloroethylene. Preferred curing agents for the preferred resins are aldehyde derived. They suitably are reactive condensates of formaldehyde with melamine or urea. Dimethylol ethylene urea is also a suitable type of curing agent.

A critical weight ratio exists between the curing agent and the thermoplastic resin. This weight ratio of the curing agent to the thermoplastic resin is always between 0.1 and 0.7 for the compositions. In fact, it is generally below 0.6. Larger ratios have been found detrimental to the achievement of the required level of reflex-reflection and detrimental to the flexibility of the cured coating of the composition.

Water-miscible organic liquids are well known; and generally these are polyhydroxylic in nature (e.g., propylene glycol, glycerine and the like). Extremely large amounts of such organic solvents are detrimental to wetting of underlying fabric surfaces and cause unduly slow drying of the applied coating. Thus it has been found that these volatile organic solvents should not be employed in excess of about two times the weight of water in the composition.

These organic solvents are selected from those in which the curing agent is either soluble or miscible. The curing agent is always in a phase of the coatable composition apart from the dispersed particles of the thermoplastic resin.

Catalysts effective to accelerate the chemical reaction between curing agents and thermoplastic resins may be employed. Illustratively, paratoluenesulfonic acid is a suitable acid catalyst to increase the rate of reaction between hexamethoxymethylmelamine and polyvinyl acetate containing resins.

Reflex-reflecting elements (see U.S. Pat. No. 2,963,378) for the composition are suitably prepared by vapor deposition of aluminum over a hemispherical portion of glass microspheres and then specially treating the hemispherical aluminum coating so as to form a barrier film on the outer exposed surface thereof. For example, hemispherically aluminized glass beads of 1.9 refractive index and a diameter range from about 25 to 50 microns are added in an amount of about 94 parts by weight to a water solution of ammonium dihydrogen phosphate. This water solution contained about 6 parts by weight of water with about 0.13 part by weight ammonium dihydrogen phosphate. The hemispherically aluminized beads are wetted with this solution and mixed for 30 minutes. After mixing, the beads are aged for 24 to 48 hours, to allow the hydrogen phosphate to react with the aluminum to form a barrier coat believed to be an aluminum phosphate. Then the treated beads are dried. This phosphate treatment has been known for use on aluminum flakes heretofore; see U.S. patent to Knoll et al. No. 2,858,230, issued Oct. 28, 1958.

An alternate procedure for forming a barrier coat involves mixing about 58 parts by weight of the hemispherically aluminized beads in a sodium dichromate water solution suitably containing about 2 parts of sodium dichromate and 40 parts of water. This mixture is heated up to about 80° C. for about 2 hours while being mixed at all times. After this heating cycle, the liquid is drained from the beads and they are dried. The resulting barrier coat on the beads is understood to be an aluminum oxide film which is much more continuous and free of any hair-line cracks than is conventional for aluminum oxide films formed by exposure to the atmosphere.

In the illustrative example, the barrier coating over the aluminum hemisphere prevents reaction between the aluminu mand water and thereby prevents the formation of a hydrogen foam. Defoaming agents are included in the examples for the purpose of reducing foaming during the screen application of the composition to a fabric.

EXAMPLE 1

An illustrative example of the invention, in parts by weight, is as follows:

Part A consists of:

| | |
|---|---|
| Acrylonitrile, acrylic acid, ethyl acrylate terpolymer emulsion (No. 65–7490–0 Laminating adhesive of Paisley Products; 40% solids resin in water) | 22.4 |
| Reflex-reflecting elements (hemispherically aluminized glass microspheres of 1.9 refractive index ($n_D$) and a diameter range between about 25 and 50 microns, with the aluminum having a barrier coat of aluminum phosphate on exterior surface) | 37.4 |
| Red spherical pigment of 2–50 microns size formed according to U.S. Pat. No. 3,251,704 | 24.4 |
| P-toluenesulfonic acid (a catalyst) | 0.7 |
| Defoaming agent (optional; "NOPCO" NXZ of Nopco Chemical Company) | 0.9 |

Part B:

| | |
|---|---|
| Hexamethoxymethylmelamine (curing agent) | 5.7 |
| Propylene glycol | 9.3 |
| Glycerine | 0.7 |

Parts A and B are packaged separately for shipment in commerce; and the two containers are marketed as a pair for mixing by the consumer. In use, the consumer blends these two parts together and then applies the total composition through screen printing or by spraying or the like to a fabric or any other surface as is desired in any pattern desired. Immediately upon drying, the composition reflex-reflects incident light. When applied to fabric, the composition wets the fabric, and then dries. Cross-linking occurs at room temperature between the terpolymer and the hexamethoxymethylmelamine, catalyzed by the P-toluenesulfonic acid.

The particle volume concentration of this example is 65.6, with most of this accounted for by the reflex-reflecting elements. Omitting the coloring pigment, the PVC of this composition is still above about 50%. The ratio of curing solids to resin solids for this composition is 0.58.

EXAMPLES 2 AND 3

| Part A: | 2 | 3 |
|---|---|---|
| Copolymer of ethyl acrylate and methyl acrylate in emulsion form and water (Rhoplex AC34 of Rohm & Haas; 46% solids resin) | 18.1 | |
| Polyvinyl acetate emulsion (a copolymer of polyvinyl acetate and polyvinyl chloride which is further identified as 71-31-41 of Paisley Products of New Jersey; 37% solids and water) | | 21.6 |
| Hydroxypropyl methylcellulose in water (10% solids; a thickener) | 0.9 | 1.1 |
| Reflex-reflecting elements of Example 1 | 71.2 | 70.0 |
| Optional defoaming agent | 0.6 | 0.7 |
| Propylene glycol | 6.4 | 3.5 |
| Wetting agent (optional; "Triton" X-100 of Rohm & Haas) | 0.9 | 1.1 |
| Part B: Tri methylol melamine | 1.9 | 2.1 |

These examples provide a neutral grey coating. They are free of the optional pigment. For Example 2, the PVC is 69.5 and the ratio of curing solids (tri methylol melamine) to resin solids is .165. For Example 3, the PVC is 71.0 and the ratio of curing solids to resin solids is .195.

The organic polymeric resins used in Examples 2 and 3 contain a small amount of —OH. Example 2 contains a trace of carboxyl; and Example 3 contains —OH probably from partial hydrolysis of the copolymer.

After mixing the two parts of the illustrative compositions together, the mixtures exhibit a varied pot life during which they may be shipped or moved and then still applied to a fabric to give satisfactory reflex reflection results. In the case of Example 1, the pot life of the mixture is at least 24 and up to about 48 hours. Examples 2 and 3, however, exhibit a pot life of about 16 hours up to about 24 hours.

That which is claimed is:

1. Transparent glass microsphere having a diameter between 10 and 100 microns and a refractive index of at least 1.7, a hemispherical surface thereof being metallized with aluminum to provide a specular-reflecting hemispherical surface adjacent the glass surface of said microsphere, and a continuous water impermeable hemispherical protective barrier film selected from the group consisting of aluminum phosphate and aluminum oxide over only the outermost surface of said metallized hemisphere.

2. The transparent glass microsphere of claim 1 in which said protective barrier film is aluminum phosphate.

3. The transparent glass microsphere of claim 1 in which said protective barrier film is aluminum oxide.

References Cited

UNITED STATES PATENTS

| 2,247,058 | 6/1941 | Irby | 117—35 |
| 2,592,882 | 4/1952 | Fisher et al. | 117—35 |
| 2,806,509 | 9/1957 | Bozzacco et al. | 161—196 |
| 3,025,764 | 3/1962 | McKenzie | 117—35 |
| 3,292,029 | 12/1966 | Palmquist et al. | 117—35 |

JULIUS FROME, Primary Examiner

H. MINTZ, Assistant Examiner

U.S. Cl. X.R.

65—21; 117—35; 161—196